United States Patent [19]
Ohta

[11] Patent Number: 5,774,354
[45] Date of Patent: Jun. 30, 1998

[54] PROGRAMMABLE CONTROLLER AND EXCLUSIVE CONTROL COMMUNICATING METHOD THEREFOR

[75] Inventor: Shun Ohta, Nagoya, Japan

[73] Assignee: Mitsubishi Denki Kabushiki Kaisha, Tokyo, Japan

[21] Appl. No.: 859,364

[22] Filed: May 20, 1997

Related U.S. Application Data

[63] Continuation of Ser. No. 365,248, Dec. 28, 1994, abandoned.

[30] Foreign Application Priority Data

Dec. 28, 1993 [JP] Japan ................. 5-338340

[51] Int. Cl.$^6$ .................................. G05B 15/00
[52] U.S. Cl. .................... 364/131; 395/287; 395/288; 395/289; 395/290
[58] Field of Search ................... 364/131–138; 395/200.01, 200.03, 200.04, 280, 281, 287–290, 293, 299, 284, 292, 306, 309, 200.3

[56] References Cited

U.S. PATENT DOCUMENTS

| | | | |
|---|---|---|---|
| 4,876,664 | 10/1989 | Bittorf et al. ................... | 364/131 |
| 5,029,168 | 7/1991 | Chan ............................. | 371/16.1 |
| 5,046,188 | 9/1991 | Molnar .......................... | 379/94 |
| 5,149,945 | 9/1992 | Johnson et al. ................ | 235/800 |
| 5,313,642 | 5/1994 | Seigel ........................... | 395/75 |
| 5,347,545 | 9/1994 | Ishii et al. ..................... | 375/37 |
| 5,349,685 | 9/1994 | Houlberg ....................... | 395/800 |

FOREIGN PATENT DOCUMENTS

| | | |
|---|---|---|
| 61-161844 | 7/1986 | Japan . |
| 2196306 | 8/1990 | Japan . |
| 2196315 | 8/1990 | Japan . |
| 2208704 | 8/1990 | Japan . |
| 2224049 | 9/1990 | Japan . |
| 357053 | 3/1991 | Japan . |
| 423539 | 1/1992 | Japan . |
| 47938 | 1/1992 | Japan . |
| 4111642 | 4/1992 | Japan . |
| 4207539 | 7/1992 | Japan . |

OTHER PUBLICATIONS

E. Habiger, "Speicherprogrammierbare Steuerungen (SPS)–Rückschau, Stand und Trends", msr, Berlin 32 (1989) 12, pp. 530–535.

P. Müller, "Kommunikation zwischen SPS in der Fabrikation", Precision Oct. 1986, pp. 7–13.

Siegfried Oblasser, "Intelligente Peripherie: Leistungssteigerung durch Aufgabenteilung", Energie & Automation 11 (1989) Special EMO 1989, pp. 68–70.

G. Färber et al., "Parallele und serielle Bussysteme, Lokale Netze", Bussysteme. R. Oldenbourg Verlag München Wien 1987, 2. Auflage, pp. 16–20, 55–59 and 145–148.

*Primary Examiner*—Reba I. Elmore
*Assistant Examiner*—Thomas E. Brown
*Attorney, Agent, or Firm*—Sughrue, Mion, Zinn, Macpeak & Seas, PLLC

[57] ABSTRACT

In the programmable controller and the exclusive control communicating method therefor according to the present invention, a program devices is connected to each of the bus-extended and distributed sections by an extension cable and an extension I/F units, and a plurality of connected program devices communicate with one CPU unit exclusively controlling each other in accordance with an exclusive control signal outputted from an exclusive control signal generating circuit.

9 Claims, 10 Drawing Sheets

PROGRAMMABLE CONTROLLER AND EXCLUSIVE CONTROL COMMUNICATING METHOD THEREFOR

This is a Continuation of application Ser. No. 08/365,248 filed Dec. 28, 1994 now abandoned.

FIELD OF THE INVENTION

This invention relates to a programmable controller, and especially to an exclusive control communication method between a CPU unit in a programmable controller and a plurality of program devices.

BACKGROUND OF THE INVENTION

The programmable controller has been evolving from a simple replacement of relays in the initial stage to an advanced and high performance simple computer system with high programmability and high flexibility. Now, relay control is provided not only over contacts and coils, but also over various functions such as differentiation, integration, reversion, and analog control. With this control, machine positioning and other requirements are carried out. Typically, analog control such as for positioning, are executed mainly by a specific function unit, and relay control is executed mainly by a CPU unit.

In association with the functions described above, in a CPU unit, in order to satisfy the need for a large scale control, a memory to store programs, namely a large program memory is required. Also, to control an object to be controlled such as a distributed production line at a high speed, as well as to built a system with low cost and to simplify the related program, the control for an expanded I/O unit or a specific function unit can be directly executed by extending a bus without using a network. However, with the extended bus configuration there is no means for program monitoring or program uploading/downloading at a location to which the bus is extended without using a network. Further, the program device must be connected to a CPU unit body.

Now description is made hereinafter for a method of communication between a CPU unit and a program device. FIG. 6 is a block diagram illustrating a general system configuration of a programmable controller based on the prior art. In this figure, the numeral 1 denotes a CPU unit to control the entire programmable controller, the numeral 2 denotes a program device which uploads/downloads a program to the CPU unit 1, and/or a program device which executes program monitoring, the numeral 3 denotes a communication cable for connection between the CPU unit 1 and the program device 2, the numeral 4 denotes an I/O unit or a specific function unit, the numeral 5 denotes an extension cable between a basic section comprising the CPU unit 1 and an I/O unit or the specific function unit 4 and an extended section OP1 comprising an I/O unit or the specific function unit 4, or between extended sections each having a similar configuration, and the numeral 6 denotes an interface unit to which the extension cable 5 is connected.

FIG. 7 is a block diagram illustrating a connection between the CPU unit and the program device 2, and in this figure the extended bus comprises a differential driver/receiver 1a. In the program device 2, DTR is an abbreviation for a data terminal ready signal line, DSR for a data set ready signal line, TXD for a transmitted data signal line, and RXD for a received data signal line. Also DTR, DSR, TXD, and RXD signal lines in the CPU unit 1 are connected via the communication cable 3 to DSR, DTR, RxD and TXD signal lines in the program unit 2, respectively.

Next, a description is made for an operation of the system from a time that the program device 2 sends data to the CPU unit 1 until the program device 2 receives data from the CPU unit. When the CPU unit 1 is in a state where communication is possible, DTR in the CPU unit 1 is turned "ON", and receiving from the program device 2 is enabled. When DSR in the program device 2 is "ON", the program device 2 turns "ON" DTR in the program device 2 to execute communication with the CPU unit 1, and if DSR of the program device 2 is "ON", the program device 2 sends data (command) TxD via the communication cable 3 to the CPU unit 1. Then, the CPU unit 1 sends data RxD corresponding to the received data (command) TxD via the communication cable 3 to the program device 2.

The program device 2 receives the data RxD, turns DTR "OFF", and terminates operation for sending or receiving data. If DSR in the program device 2 is "OFF" after the program device 2 turned "ON" DTR in the program device 2, the program device 2 determines that another program device is communicating, and turns "OFF" DTR in the program device 2 to terminate operation for communication.

FIG. 8 is a timing chart showing the timing for communication between the program device 2 and the CPU unit 1, and DTR, DSR, TxD and RxD in this figure are signals viewed from the side of the program device 2. As shown in this figure, the program unit 2 turns DTR "ON" (t2) after it checks that DSR is "ON" ($t_1$), and furthermore the program device 2 sends or receives data after it checks that DSR is "ON" ($t_3$), and finally turns DTR "OFF" ($t_4$) to terminate the processing for communication.

FIG. 9 to FIG. 11 are flow charts each schematically illustrating the operation described above. Namely FIG. 9 is a flow chart illustrating operation of the program device 2 when it communicates with the CPU unit 1, FIG. 10 is a flow chart illustrating operation of the program device 2 when it turns on power for the CPU unit 1, and FIG. 11 is a flow chart illustrating operation of the CPU unit 1 in a communication process corresponding to a communication process of the program device 2 shown in FIG. 9.

As shown in FIG. 9, the program device 2 makes a determination as to whether DSR is "ON" or not (S11), and terminates the operation without executing any processing if it determines that DSR is "OFF", and turns DTR "ON" if it determines that DSR is "ON" (S12). Then, the program device 2 again makes a determination as to whether DSR is "ON" or not (S13), and turns DTR "OFF" (S15) to terminate the communication process if it determines that DSR is "OFF". If it determines that DSR is "ON", the program device 2 sends data to or receives data from the CPU unit 1 (S14) and, after data is sent or received, turns DTR "OFF" (S15) to terminate the communication process.

Also, as shown in FIG. 10, when power is turned ON, the CPU unit 1 executes an initial processing (S16), and then turns DTR "ON" (S17). When the CPU unit 1 turns DTR "ON", DSR in the program device 2 connected to DTR in the CPU unit 1 is turned "ON", then a communication processing by the aforesaid program device 2 is enabled.

Furthermore, as shown in FIG. 11, the CPU unit 1 executes a process for receiving data (command) from the program device 2 (S18), then executes a process for sending data to the program device 2 (S19), and terminates the communication processing.

Background documents relating to the present invention include the Japanese Patent Laid Open Publication No. 57053/1991 disclosing the "Download control method for communication processors", the Japanese Patent Laid Open Publication No. 207539/1992 disclosing the "Communicating means", the Japanese Patent Laid Open Publication No. 23539/1992 disclosing the "Transfer device centralized state control system", the Japanese Patent Laid Open publication No. 111642/1992 disclosing the "Selective broadcast communication system", the Japanese Patent Laid Open Publication No. 7938/1992 disclosing the "Electronic equipment with exclusive control type communicating functions and a communication system using the equipment", the Japanese Patent Laid Open Publication No. 57053/1991 disclosing the "Download control system for communication processors", the Japanese Patent Laid Open Publication No. 161844/1986 disclosing the "Control system for communication processors", the Japanese Patent Laid Open publication No. 208704/1990 disclosing the "I/O bus extension device for programmable controllers", the Japanese Patent Laid Open Publication No. 224049/1990 disclosing the "I/O bus extension device for programmable controllers", the Japanese Patent Laid Open Publication No. 196315/1990 disclosing the "I/O buffer of sequencer", and the Japanese Patent Laid Open Publication No. 196306/1990 disclosing the "Sequencer".

In a programmable controller based on the prior art, generally the distance between a basic section and an extended section or between extended sections is around 50 m, so that only one unit of program device can be connected to a basic section of a CPU unit, and also communication is possible only to the unit. For this reason, in an area around an extended section based on bus extension, the effective connection of one or more program devices and communication therewith are difficult.

Also, whenever debugging or maintenance work is carried out in the distributed extended sections, a maintenance person must always go to the basic section where the CPU unit is installed, which makes the work efficiency low.

SUMMARY OF THE INVENTION

It is an object of the invention to provide a programmable controller and an exclusive control communicating method which improves an efficiency in debugging or maintenance of programs and substantially improves the general work efficiency by enabling debugging or maintenance in distributed extended sections at a site without disconnecting a program device from a CPU unit. In this manner, communication with the CPU unit is available as required, even during debugging or maintenance activity.

A programmable controller according to the present invention comprises a basic section comprising a CPU unit which controls the entire programmable controller and an I/O unit or a specific function unit and a plurality of extended sections. Each of the extended sections comprises a program device which executes program download/upload to the aforesaid CPU unit or monitoring, and a I/O unit or a specific function unit connected to the aforesaid basic section with a bus. The programmable controller also has a bus extending means for connecting a program device to the aforesaid basic section and extended sections and a switching means which is provided within the aforesaid bus extending means and executes exclusive signal control.

Also in an exclusive control communicating method for a programmable controller according to the present invention, the aforesaid switching means makes a determination as to whether the data set ready signal in each of the aforesaid program devices is ON or not, and turns ON the data terminal ready signal for the aforesaid program device if it determines that the data set ready signal is ON, and then makes a determination again as to whether the data set ready signal described above is ON or not, and if it determines that the data set ready signal is not ON, furthermore makes a determination as to whether retry was executed n times or not, and if it determines that retry was executed n times, the switching means turns OFF the data terminal ready signal described above without sending or receiving data.

In the programmable controller and the exclusive control communicating method therefor according to the present invention, a program device is connected to each of the bus-extended and distributed sections respectively, and a plurality of connected program units communicate with one CPU unit exclusively controlling thereon.

Other objects and features of this invention will become understood from the following description with reference to the accompanying drawings.

DESCRIPTION OF THE EMBODIMENTS

Figure 1:
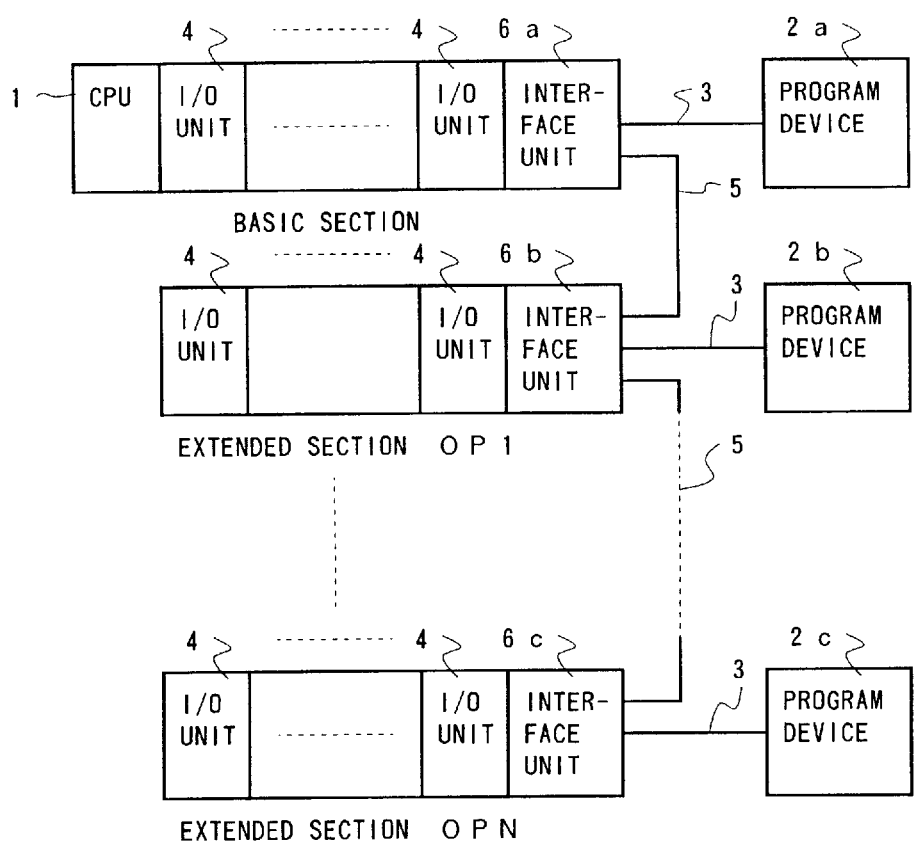
FIG. 1 is a block diagram illustrating a general system configuration of a programmable controller according to the present invention.

Description is made hereinafter for embodiments of a programmable controller and the exclusive control communicating method according to the present invention with reference to the related drawings. FIG. 1 is a block diagram illustrating a general system configuration of a programmable controller according to the present invention. In this figure, the numeral 1 denotes a CPU unit to control the entire programmable controller, the numerals 2a to 2c each denotes a program device which downloads/uploads a program to the CPU unit 1 or monitors a program, the numeral 3 denotes a communication cable for connection between extension interface (called extension I/F) units 6a to 6c and program devices 2a to 2c respectively.

Also the numeral 4 denotes an I/O unit or a specific function unit, the numeral 5 denotes an extension cable for connection between a basic section comprising the CPU unit 1 and an I/O unit or the specific function unit 4 and an extended section OP1 comprising an I/O unit or the specific function unit 4 or between extended sections each having a similar configuration via the extension interface unit 6a to 6c. Each extension I/F unit 6a to 6c is for connection between a basic section and the extended section 1 or between extended sections, and also is for connection between the program devices 2a to 2c, the basic section, and each extended section via the communication cable 3.

Figure 2:
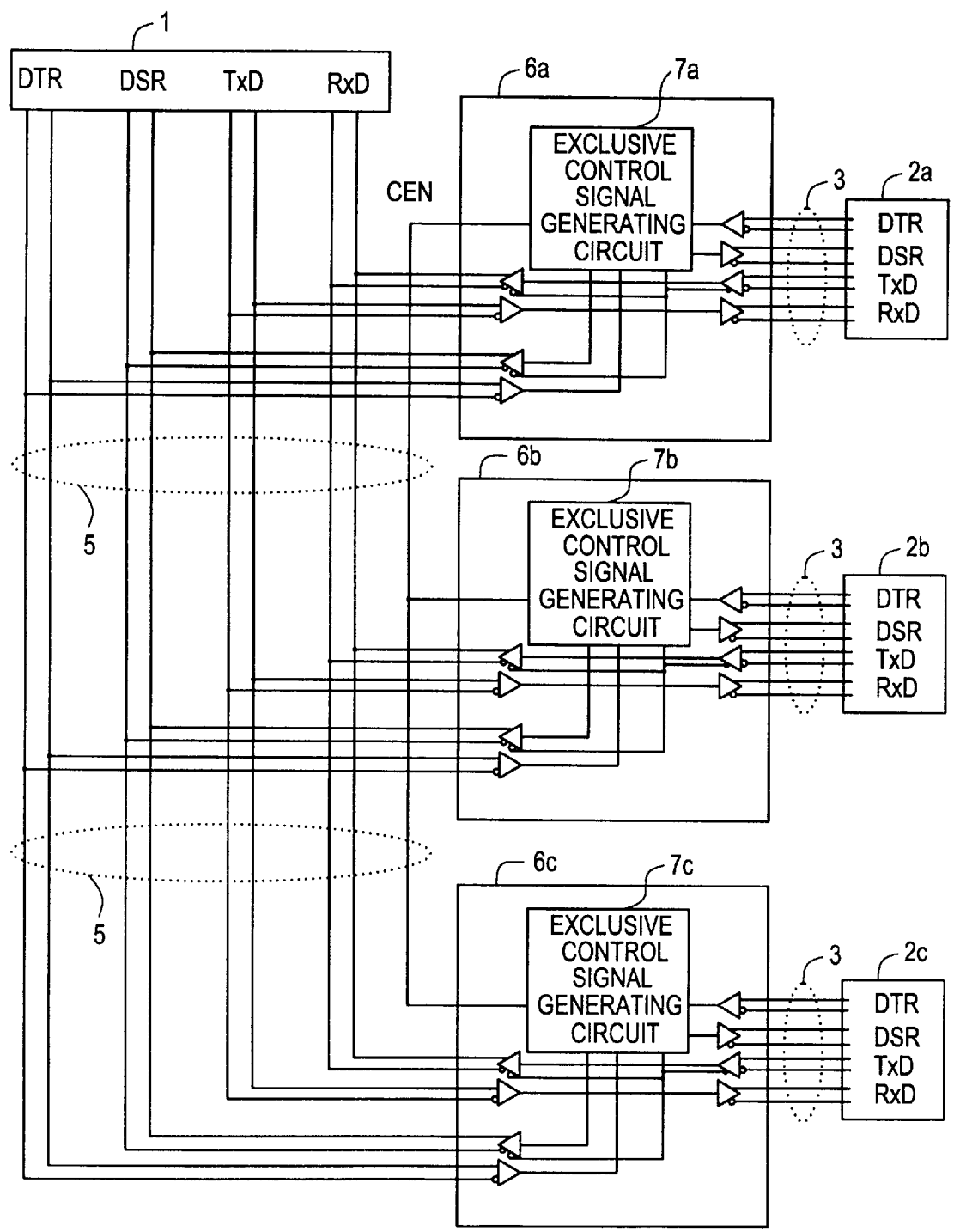
FIG. 2 is a block diagram illustrating a connection between program units according to the present invention, extended I/F units, and CPU units.

FIG. 2 is a block diagram illustrating a system configuration wherein the program devices 2a to 2c are connected via the communication cable 3 to the extension I/F units 6a to 6c and furthermore to the CPU unit 1. Exclusive control signal generating circuits 7a to 7c provide exclusive control communication in each of the program devices 2a to 2c. The DTR and DSR signal lines in each of the program devices 2a to 2c are connected via the exclusive control signal generating circuits 7a to 7c to DSR and DTR signal lines in the CPU unit 1. The TxD and RxD signal liens in each of the program devices 2a to 2c are connected to RxD and TxD signal lines in the CPU unit 1.

Figure 3:
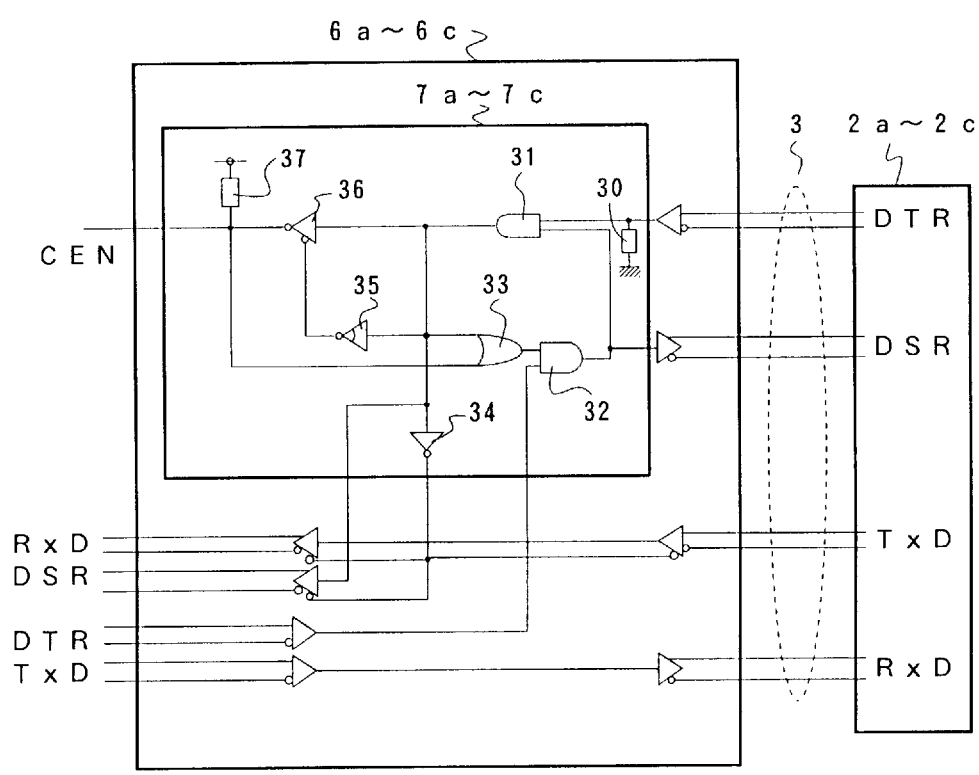
FIG. 3 is a circuit diagram illustrating the general configuration of the exclusive control signal generating circuit shown in FIG. 2.

FIG. 3 is a block diagram illustrating the contents of the aforesaid exclusive control signal generating circuits 7a to 7c. In the exclusive control signal generating circuits 7a to 7c, the numeral 30 denotes a pull-down resistor, the numerals 31, 32 each denotes an AND gate, the numeral 33 denotes an OR gate, the numerals 34, 35, 36 each denotes a NOT gate (inverter), and the numeral 37 denotes a pull-up resistor.

Next, description is made for operations of the exclusive control signal generating circuits 7a to 7c. A pull-down resistor 30 is connected to the DTR signal line viewed from the side of the program devices 2a to 2c. The DTR and DSR signals viewed from the side of the program devices 2a to 2c are entered into the AND gate 31. An output signal from the AND gate 31 is entered into the NOT gate 36, and the pull-up resistor 37 is connected to the output line CEN and provided as output. Also an output signal from the AND gate 31 described above is connected to the NOT gate 35. Furthermore, an output signal from the aforesaid NOT gate 36 and an output signal from the aforesaid AND gate 31 are entered into the OR gate 33. An output signal from OR gate 33 and the DTR signal viewed from the programmable controller are entered into the AND gate 32. An output signal from the AND gate 32 is connected to the DSR line viewed from the program devices 2a to 2c. The DTR signal viewed from the side of program devices 2a to 2c is entered as another element for the AND gate 31, and a signal via said AND gate 31 and NOT gate 36 is provided as an output CEN.

Also an output signal from the AND gate 31 is connected to the DSR line viewed from the side of the programmable controller. An output signal from the NOT gate 34 is connected as a control signal for the TxD signal viewed from the side of a program device and as a control signal for the RxD signal viewed from the side of the programmable controller. The DTR signal viewed from the side of the programmable controller is entered into the exclusive control signal generating circuits 7a to 7c, and the TxD signal viewed from the side of the programmable controller is connected to the RxD signal line viewed from the side of the program devices 2a to 2c.

Then description is made below for general operation. The following description assumes a case where the program device 2a connected to the extension I/F unit 6a communicates with the CPU unit 1. In this case, the program device 2a checks whether DSR is ON or not. If DSR is ON, the program device 2a turns DTR ON. Also, if DSR is ON, the program device 2a executes an operation for sending or receiving data. When the receiving or sending operation ends, the program device 2a turns DTR OFF and terminates communication.

Operation of the program devices 2a to 2c is substantially the same as that based on the prior art, but DTR and DSR are generated as exclusive control signals by the exclusive control signal generating circuit 7a to 7c. Namely, the DTR signal in the CPU unit 1 and the CEN signal (exclusive control signal) are inputs to an AND circuit formed by the exclusive control signal generating circuits 7a to 7c, so that DSR in the extension I/F units 6a to 6c is turned ON when both the DTR signal in the CPU unit 1 and the CEN signal are turned ON.

The CEN signal is connected in the form of wired OR in the exclusive control signal generating circuits 7a to 7c in each of the extension I/F units 6a to 6c, and each of the circuits 7a to 7c is connected to the DTR signal line in the program devices 2a to 2c. For this reason, for instance, when the program device 2a turns DTR ON, CEN is turned OFF, and at the same time when DTR in the CPU unit 1 is ON, DSR in the program device 2a is ON.

Also, when the CEN line signal is turned OFF, the DSR line in the program devices 2b, 2c is turned OFF, so that the exclusive control can be executed. In this step, the program devices 2b, 2c previously determines whether DTR is OFF and DSR is ON. Also, the OR 33 between the CEN line and DTR line from the program devices 2b, 2c in the exclusive control signal generating circuits 7a to 7c is OFF. Finally, the program device 2a turns the DTR signal line OFF, so that the CEN line is turned ON and DTR control in the program devices 2a to 2c is enabled.

Figure 4:
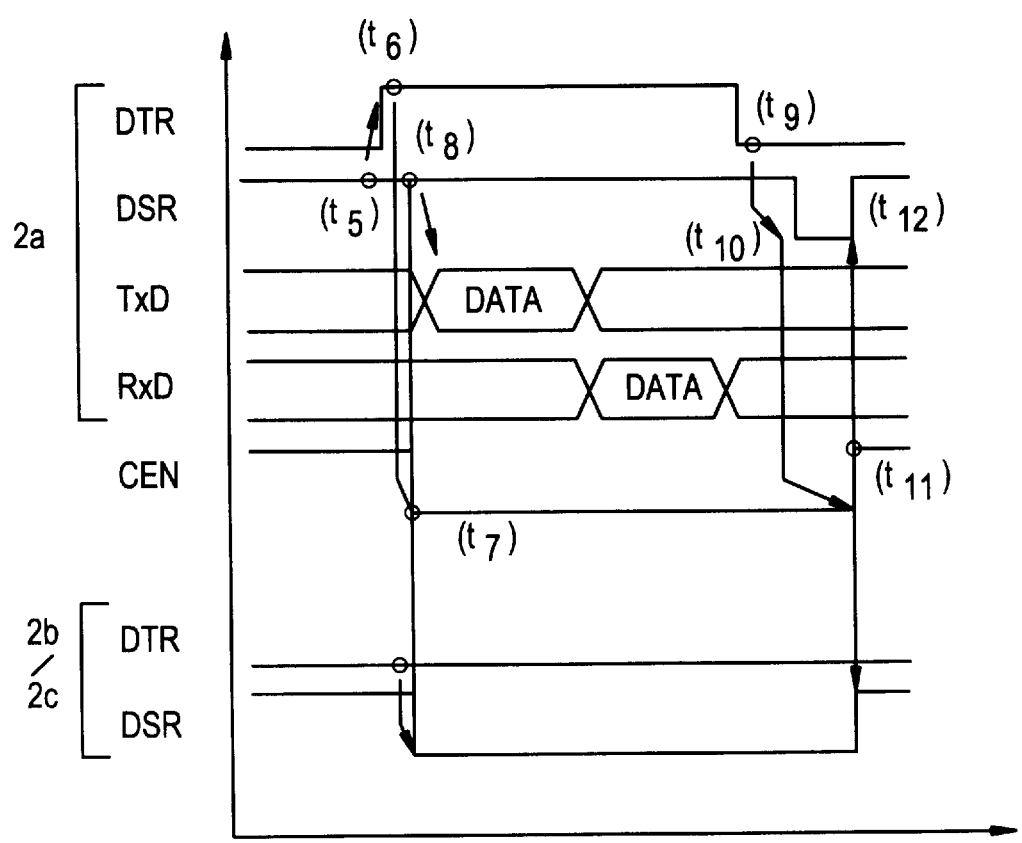
FIG. 4 is a timing chart showing timing for communication in a program device according to the present invention.

FIG. 4 is a timing chart for the program device 2a described above. DTR, DSR, TXD, and RxD are signals from the program devices 2a. Namely, when DSR is ON ($t_5$), if DTR is turned ON ($t_6$), CEN is turned OFF ($t_7$), and furthermore DSR is kept in an ON state ($t_8$). In this state, the program device 2a and the CPU unit 1 execute data communication. After the data communication ends, when DTR is turned OFF (t9), DSR is once turned OFF ($t_{10}$); but, as CEN is turned ON ($t_{11}$), DSR is again turned ON ($t_{12}$), thus communication being enabled.

Figure 5:
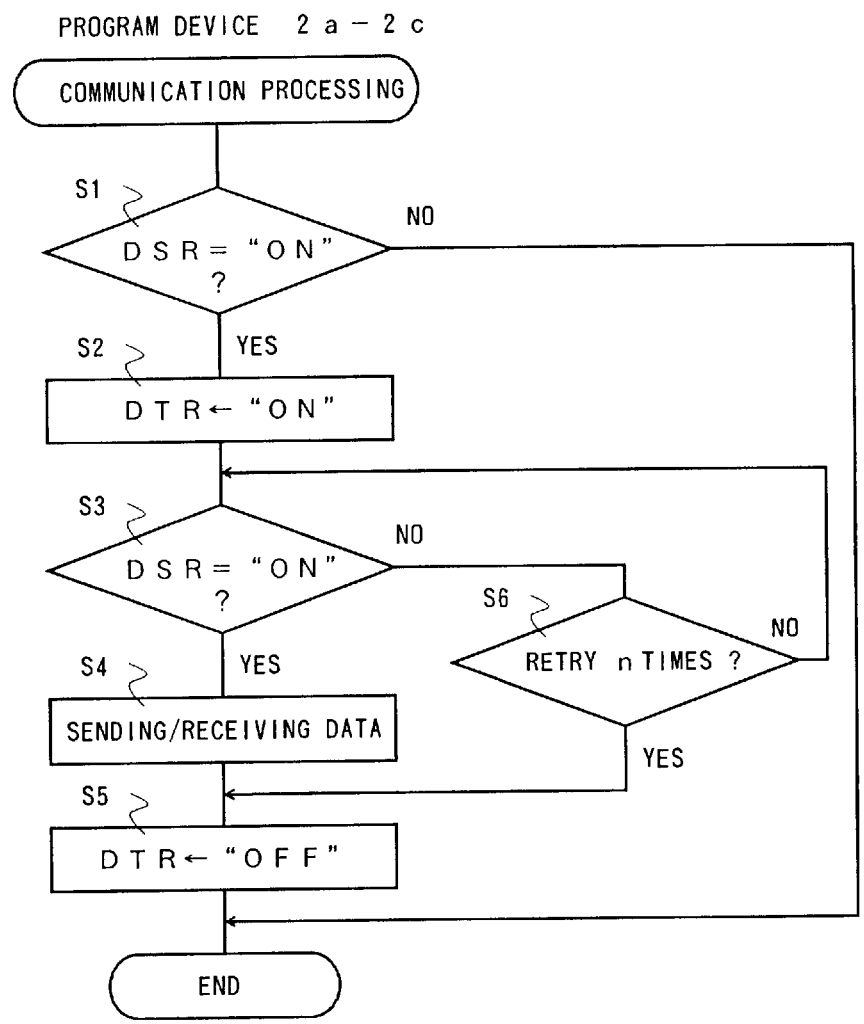
FIG. 5 is a flow chart illustrating the exclusive control communicating operation in a programmable controller according to the present invention.
Figure 6:
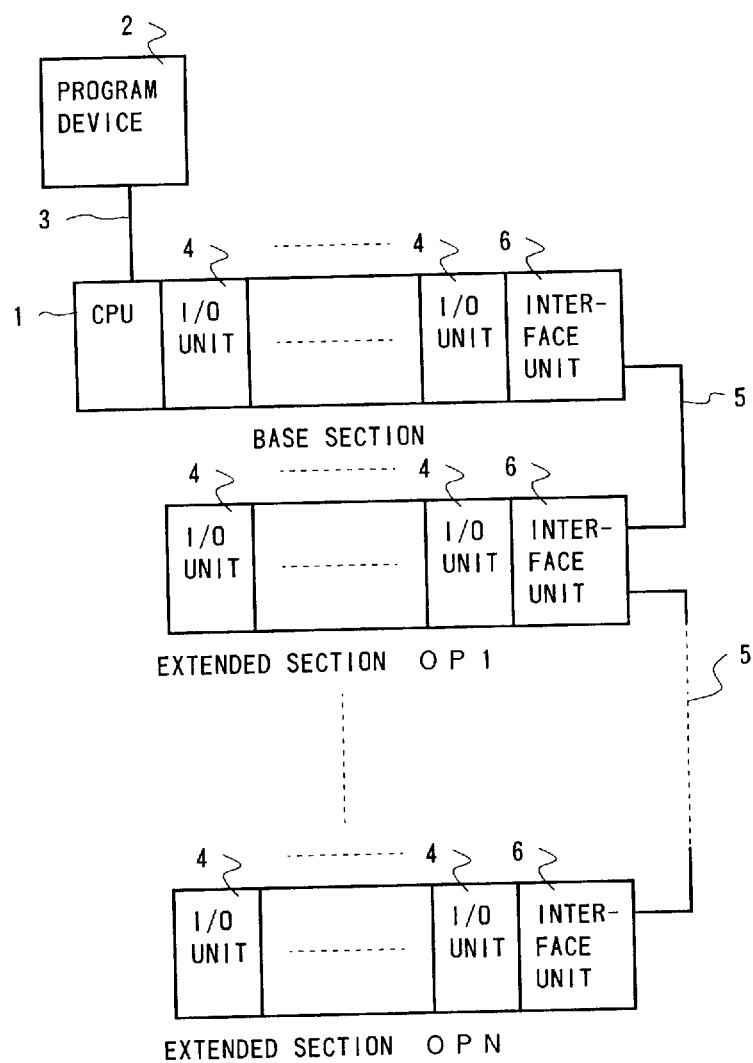
FIG. 6 is a block diagram illustrating a system configuration of a conventional type of programmable controller.
Figure 7:
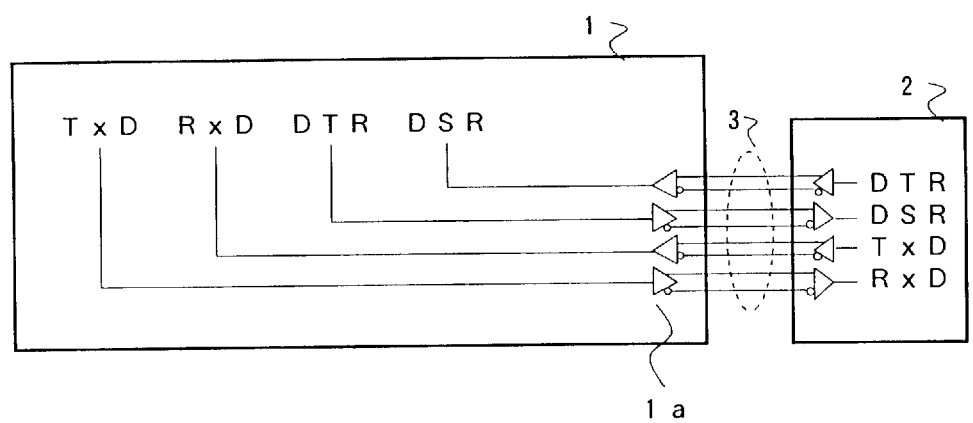
FIG. 7 is a block diagram illustrating a connection between a conventional type of program device and a CPU unit.
Figure 8:
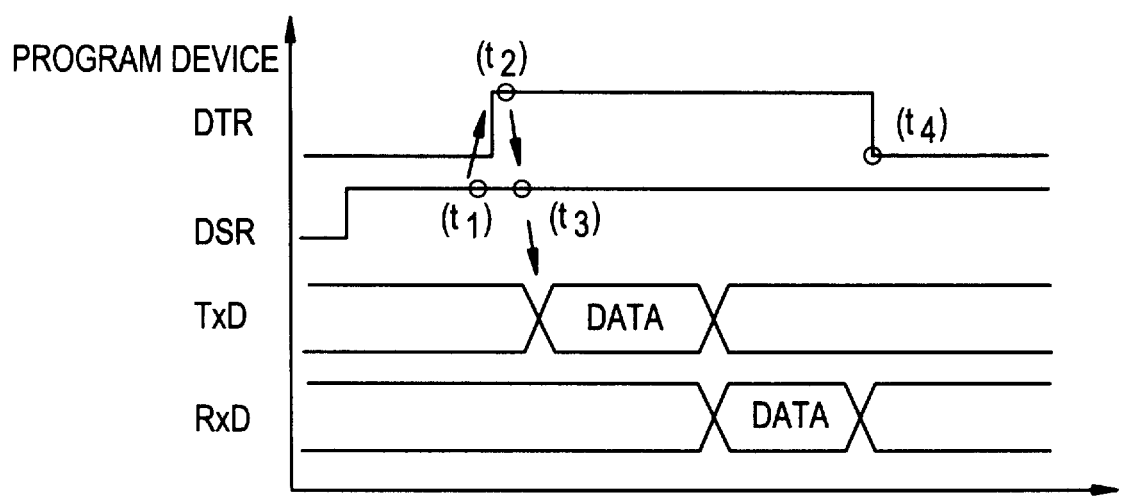
FIG. 8 is a timing chart showing the timing for communication in a conventional type of program device.
Figure 9:
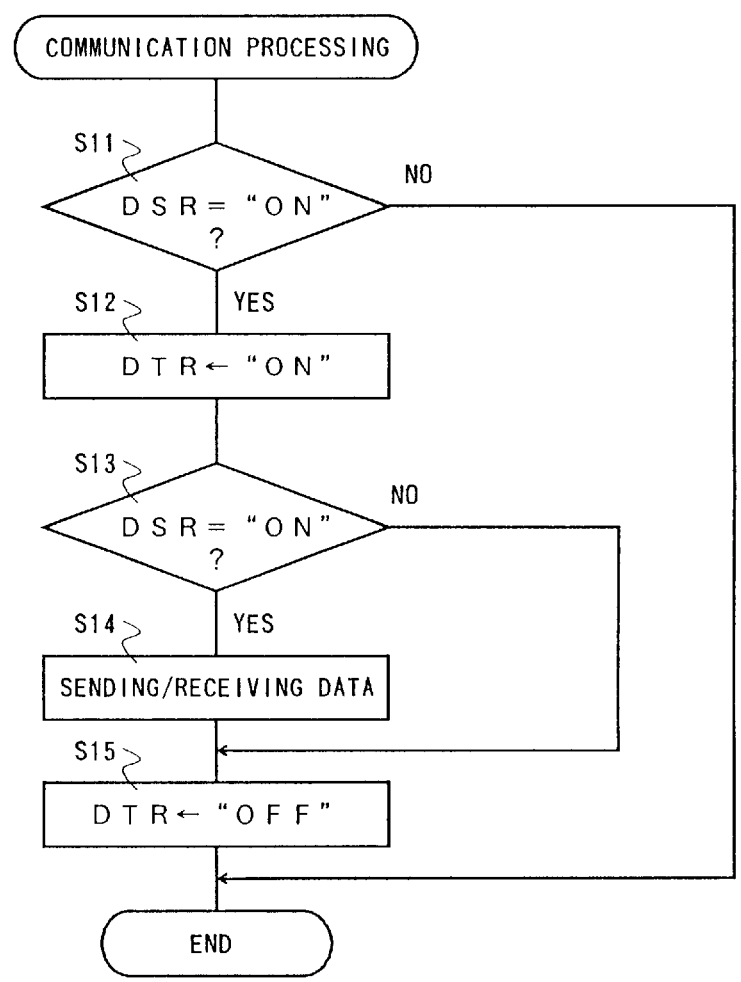
FIG. 9 is a flow chart illustrating an operation for communication in a conventional type of program device.
Figure 10:
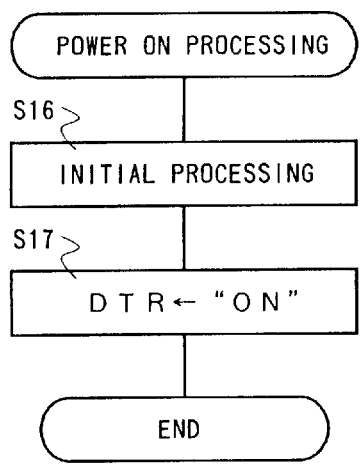
FIG. 10 is a flow chart illustrating a power ON operation in a conventional type of CPU unit.
Figure 11:
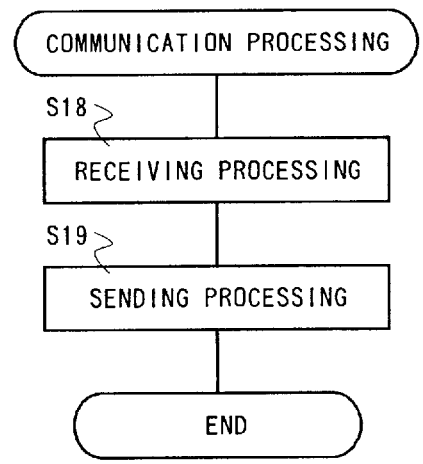
FIG. 11 is a flow chart illustrating an operation for communication processing in a conventional type of CPU unit.

FIG. 5 is a flow chart schematically illustrating the operation described above. Namely FIG. 5 is a flow chart illustrating the operation of the program device 2a when the program device 2a communicates with the CPU unit 1. Processing when power for the CPU unit 1 is ON and also processing during communication processing by the CPU unit 1 corresponding to the communicating state of the program device 2 are similar to those shown in FIG. 10 and FIG. 11, each illustrating a case based on the prior art. As shown in FIG. 5, the program device 2a makes a determination as to whether DSR is ON or not (S1), and terminates the communication processing without executing any processing if it determines that DSR is OFF, and turns DTR ON if it determines that DSR is ON (S2). Then the program device 2a again makes a determination as to whether DSR is ON or not (S3), and, if it determines that DSR is OFF, makes a determination as to whether retry is executed n times or not (S6), and returns to the step S3 above if it determines that retry has not been executed n times, and turns DTR OFF (S5) and terminates the communication processing if it determines that retry has been executed n times. Also in the step S3 above, if the program device 2a determines that DSR is ON, it receives data from or sends data to the CPU unit 1 (S4), and when the operation for receiving or sending data ends, the program device 2a turns DTR OFF(S5) and terminates the communication processing.

In each of the embodiments described above, description was made of an operation for receiving or sending data using the present invention, but was applied only to use of hand-shake control commands. In a case where N program devices are connected to one CPU unit and only one of the program devices communicates with the CPU unit, the present invention can be applied to any type of communication.

As described above, with the programmable controller and the exclusive control communicating method according to the present invention, a program deice is connected to each of a plurality of bus-extended and distributed sections respectively, and the plurality of program devices connected as described above communicates with one CPU unit executing exclusive control, so that debugging or maintenance in a bus-extended and at the same time distributed section can be carried out at the site without disconnecting the program device, also the program device is kept connected to each distributed and extended section to enable communication with the CPU unit according to the necessity, and for this reason the efficiency in program debugging or maintenance is raised and also the general work efficiency can substantially be improved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A programmable controller comprising:
   a basic section, comprising a CPU unit and at least an I/O unit or a specific function unit, which controls the programmable controller;
   a plurality of program devices for executing download/upload of a program or a monitoring operation of a program in said CPU unit, at least a first one of said plurality of program devices being connected to said basic section;
   a first extended section comprising an I/O unit or a specific function unit;
   a first bus extension unit connecting said first of the program devices to said basic section;
   a second bus extension unit connecting said basic section to said first extended section, and connecting a second of said plurality program devices to said basic section; and
   an exclusive control signal generator for generating and outputting an exclusive control signal to each bus extension unit for instructing operation of each bus extension unit, wherein each bus extension unit receives the exclusive control signal, and in response to the exclusive control signal only one of the bus extension units operates to provide data communication between the program device connected thereto and the CPU unit.

2. The programmable controller as set forth in claim 1, further comprising a common bus connected to the bus extension units.

3. A programmable controller comprising:
   a basic section, comprising a CPU unit and at least an I/O unit or a specific function unit, which controls the programmable controller;
   a plurality of program devices for executing download/upload of a program or a monitoring operation of a program in said CPU unit, at least a first one of said plurality of program devices being connected to said basic section;
   a first extended section comprising an I/O unit or a specific function unit;
   a first bus extension unit connecting said first of the program devices to said basic section;
   a second bus extension unit connecting said basic section to said first extended section, and connecting a second of said plurality program devices to said basic section; and
   an exclusive control signal generator for generating and outputting an exclusive control signal to each bus extension unit for instructing operation of each bus extension unit,
   wherein each bus extension unit receives the exclusive control signal, and in response to the exclusive control signal only one of the bus extension units operates to provide data communication between the program device connected thereto and the CPU unit; and
   wherein said CPU unit and each of said plurality of program devices comprises a data terminal ready (DTR) line means for generating a DTR signal, a data set ready (DSR) line means for receiving the DTR signal, a transmit data (TxD) line means for transmitting data and a receive data (RxD) line means for receiving the transmitted data, and said exclusive control signal generator is connected to receive and to respond to said DTR and DSR signals and said transmit and receive data for generating said control signal.

4. The programmable controller as set forth in claim 1, further comprising a second extended section, wherein said first and second extended sections are operative to communicate with each other and with said basic section.

5. The programmable controller as set forth in claim 3, wherein said exclusive control signal generator further comprises:
   means for making a first determination as to whether or not said DSR signal for each of said program devices is ON;
   means for turning ON the DTR signal for at least one of said program devices, when a respective DSR signal is ON;
   means for making a second determination as to whether or not said DSR signal is ON, and either sending or receiving data, or retrying said second determination no more than N times; and
   means for turning said TxR signal OFF without executing a data transaction when a retry operation has been executed N times.

6. The programmable controller as set forth in claim 1, wherein said basic section and said extended section are separated by a distance of 50 meters or more.

7. A programmable controller comprising:
   a basic section, comprising a CPU unit and at least an I/O unit or a specific function unit, which controls the programmable controller;
   a first program device for executing a download/upload operation or monitoring of a program in a CPU unit, connected to said basic section;
   a first extended section comprising an I/O unit or a specific function unit;
   a second program device for executing a download/upload operation or monitoring of a program in said CPU unit;

a first bus extension unit operative to provide a data communication path between said first program device and is said CPU unit;

a second bus extension unit operative to provide a data communication path between said second program device and said CPU unit and between said first extended section and said basic section; and an exclusive control signal generator for generating and outputting an exclusive control signal to said first and second bus extension unit such that only one of said first and second bus extension unit operates to provide a data communication path between the program device connected to the operative bus extension unit and the CPU while the other bus extension unit does not operate to provide a data communication path to the CPU unit.

8. The programmable controller as set forth in claim 7, wherein said basic section and said extended section are separated by a distance of 50 meters or more.

9. The programmable controller as set forth in claim 1, wherein said first bus extension unit connects said first of said program devices directly to said basic section, said second bus extension unit connects said second of said program devices directly to said basic section and connects said basic section directly to said first extension section.

* * * * *